April 7, 1970  N. E. ALEXANDER  3,504,801
SPACED WALL TYPE, REVERSE OSMOSIS FILTER ASSEMBLY
Filed July 25, 1969
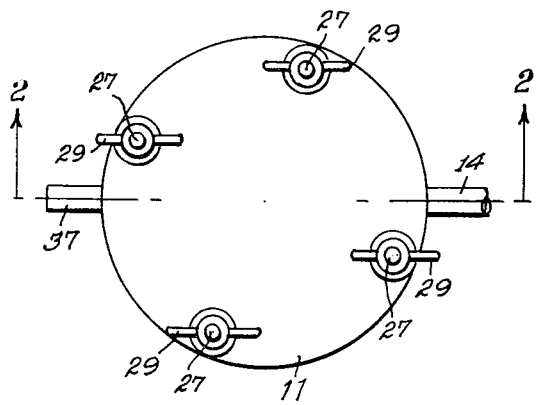
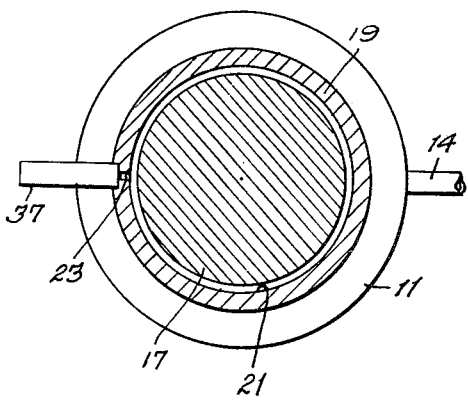
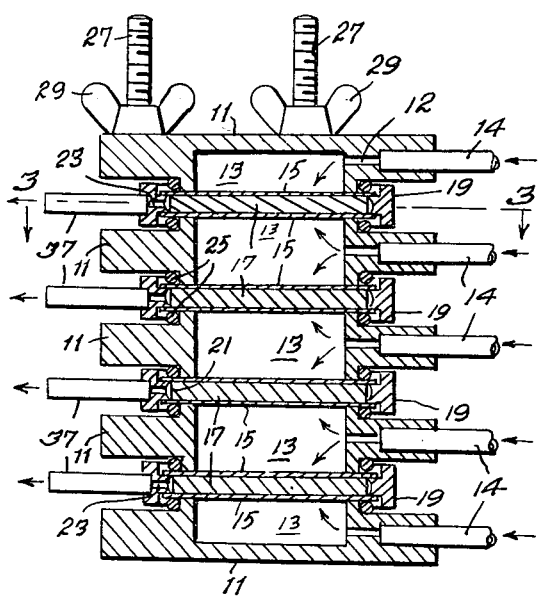
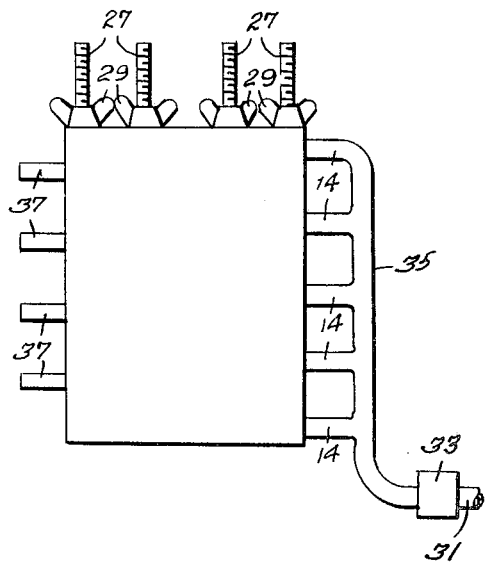
INVENTOR,
Nelson E. Alexander
BY: Harry M. Saragovitz,
Edward J. Kelly &
Herbert Berl
ATTORNEYS.

3,504,801
SPACED WALL TYPE, REVERSE OSMOSIS
FILTER ASSEMBLY
Nelson E. Alexander, Frederick, Md., assignor to the
United States of America as represented by the Secretary of the Army
Continuation-in-part of application Ser. No. 510,459,
Nov. 26, 1965. This application July 25, 1969, Ser.
No. 845,002
Int. Cl. B01d 31/00, 13/00
U.S. Cl. 210—321                              4 Claims

ABSTRACT OF THE DISCLOSURE

An apparatus for the treatment of solutions by reverse osmosis having a series of chambers separated by membrane filters supported on porous metal discs.

---

This application is a continuation-in-part of application 510,459, filed Nov. 26, 1965, and now abandoned.

The invention described herein may be manufactured, used and licensed by or for the Government for governmental purposes without the payment to me of any royalties thereon.

This invention relates to an apparatus for removing particles from solutions. More particularly, it relates to an apparatus for removing particles from solutions utilizing reverse osmosis.

Reverse osmosis is a process which can be used for purification of water and for concentration and purification of a variety of foods, pharmaceuticals and chemicals. Normal osmotic flow in a system takes place when a semipermeable membrane is placed between, for example, pure water and a solution. Under these conditions, the water will flow into the solution until the increased column height produces a "back pressure" equal to the osmotic pressure of the solution. The direction of flow can be reversed, however, if a pressure greater than the osmotic pressure is applied to the solution by any suitable means. This reversal of osmotic flow is called reverse osmosis. In some respects, reverse osmosis resembles filtration on a molecular scale. However, the mechanisms involved are much more complex, and not clearly understood. A description of reverse osmosis is set forth in the November 1968 issue of Instruments and Control Systems, vol. 44, No. 11, p. 44.

It is an object of this invention to provide and disclose a simple apparatus for the treatment of solutions by reverse osmosis.

It is a further object of this invention to provide and disclose an apparatus having a series of chambers, whereby each chamber is separated by a semipermeable membrane supported on fiber metal disc.

It is a further object of this invention to provide an apparatus whereby the supported membrane is capable of withstanding pressures up to 2000 p.s.i.

It is a further object of this invention to provide and disclose an apparatus having a large filtering surface area.

Other objects and a fuller understanding of this invention may be had by referring to the following description and claims taken in conjuction with the accompanying drawing in which:

FIG. 1 shows a top view of the filtering system.

FIG. 2 shows an elevated sectional view of the multiple membrane filtering unit taken through section 2—2 of FIG. 1.

FIG. 3 shows a sectional view of the filtering disc taken through section 3—3 of FIG. 2.

FIG. 4 shows a general schematic illustration of reverse osmosis employing the present system.

Referring now to FIG. 2, the present filtering apparatus comprises a stack of secured metal mounting rings designated 11. Ring 11 contains orifice 12 whereby the solution to be filtered enters the system by means of tubing 14. Interspersed horizontally between stacked rings 11 are a series of semipermeable membranes 15 supported on porous metal discs 17 thereby forming chambers 13. The discs in turn are fitted into rim 19. The rim comprises groove 21 positioned in the center of the interior along the entire length thereof as shown in FIG. 3. Groove 21 forms an initial manifold to collect the filtered liquid passing radially through the porous fiber disc. Discs 17 are sealed and secured between the chambers by rubber O-rings 25. Metal mounting rings 11 are secured by means of 4 bolts, designated 27, extending vertically from the bottom to top, along the periphery of the stack of elements. The bolts are secured by wing nuts 29.

The fiber metal, utilized as the membrane support, was originally developed by Armour Research Foundation. The material is produced by a technology called fiber metallurgy. Basically, the metal fibers are felted as in paper making and the felted fibers are sintered as in powder metallurgy. In the final product, the randomly interlocked felted fibers are heated to form a metallic weld bond at each point of contact between them. Fiber metal produces a clean and reasonable inert support for the membrane with radial as well as axial porosity so that clean filtered liquid may be removed from the interior of the fiber metal support. The fiber metal manufacturing process produces a product that has the desirable characteristic of very small pores on the surface that provide almost continuous support for the membrane filter and at the same time this surface is strongly supported underneath. In addition, the interior is quite porous for freedom of movement for liquid to outlets. Stainless steel or other alloys can be selected for maximum corrosion resistance and compatability with the fluid to be filtered. Fiber metal is very clean and does not shed particles than can contaminate the filtered liquid.

The types of filter membranes that can be used with this holder is not limited. It can be used with chemical filters, bacteriological membrane filters, ion exchange membranes or reverse osmosis membranes for water desalinization and purification. The latter type membranes are commercially available. For example, a graphitic oxide membrane has been developed by Westinghouse Electric Corp.'s Research Laboratories by depositing a graphic oxide layer about 0.3 micron thick on a porous substrate. In addition, a membrane for reverse osmosis has been developed by Eastman Plastics. It consists of two back-to-back layers of cellulose acetate. A dense layer of cellulose acetate bars the passage of dissolved salts, while a porous layer permits diffusion of purified water to a collecting system.

The application of reverse osmosis to sea water requires pressures in the 1000 p.s.i. to 2000 p.s.i. range. Brackish water requires pressures in the order of 600 p.s.i. The high structural strength of the assembly and the high structural strength of the fiber metal and close spacing of support given the filter medium, combine to make the holder for multiple membrane filters a unit of choice for reverse osmosis application.

Referring now to FIG. 4, the solution to be purified, e.g., sea water, is supplied through feed pipe 31 to pump 33, which supplies this solution under pressure to manifold pipe 35. The solutions enters chamber 13 through orifice 12, as shown in FIG. 2. The impurities are removed by membrane 15, and the purified liquid passes into the interior of disc 17 and exits through orifice 23 and tubing 37, where it may be collected in any suitable manner.

Although, I have described my invention with a certain degree of particularity, I wish it to be understood that I do not desire to be limited to the exact details of construction shown and described, for obvious modifications will occur to a person skilled in the art.

Having described my invention, I claim:

1. An apparatus for filtering particles from a solution comprising a series of chambers, entrance means communicating with each chamber, a semipermeable membrane covering the opposite sides of a porous metal disc which is interspersed between each chamber, the periphery of the metal disc fitted to an annular rim support means, the rim support means comprising a filtrate collecting, endless groove facing the perimeter of said disc, and liquid exit means located on the rim support means and communicating with said collecting groove.

2. An apparatus in accordance with claim 1 for filtering particles from a solution by means of reverse osmosis.

3. An apparatus in accordance with claim 2 wherein the porous metal disc is constructed of stainless steel.

4. An apparatus in accordance with claim 3 wherein the porous metal disc is capable of withstanding pressures of up to 2000 p.s.i.

References Cited

UNITED STATES PATENTS

| | | | |
|---|---|---|---|
| 3,133,132 | 5/1964 | Loeb et al. | 210—23 X |
| 3,456,805 | 7/1969 | Jarvis et al. | 210—321 |

REUBEN FRIEDMAN, Primary Examiner

F. A. SPEAR, Jr., Assistant Examiner

U.S. Cl. X.R.

210—346, 486